April 21, 1959     M. P. PEUCKER     2,882,731

DOUBLE DIAPHRAGM ELECTRICAL PRESSURE GAGE

Original Filed May 12, 1952

United States Patent Office 2,882,731
Patented Apr. 21, 1959

2,882,731

DOUBLE DIAPHRAGM ELECTRICAL PRESSURE GAGE

Max P. Peucker, Washington, D. C., assignor to the United States of America as represented by the Secretary of the Navy Original application May 12, 1952, Serial No. 287,411, now Patent No. 2,784,593, dated March 12, 1957. Divided and this application April 7, 1955, Serial No. 502,757

9 Claims. (Cl. 73—398)

(Granted under Title 35, U.S. Code (1952), sec. 266)

The invention described herein may be manufactured and used by or for the Government of the United States of America for governmental purposes without the payment of any royalties thereon or therefor.

This invention relates to a pressure gage for instantaneously measuring static and dynamic pressures on aerodynamic bodies in wind tunnels and also in free-flight investigations on missiles and airplanes.

This application is a division of my copending application, Serial No. 287,411, filed May 12, 1952 which matured into U.S. Patent 2,784,593 on March 12, 1957.

Heretofore, in conducting experiments on models in wind tunnels it has been the practice to provide small holes in the surface of the model at the points of desired pressure determination. Long tubes of small diameter connected these holes with manometers or vacuum meters located outside the wind tunnel. After the blow within the wind tunnel commenced, a considerable period of time was required to equalize the pressure in the system due to the relatively large volume of the pressure measuring system and due to the flow resistance of the long small tubes. In supersonic wind tunnels where the length of blow is limited to a short period of time, as, for example, 40 seconds, such time delay is highly undesirable.

The invention herein disclosed overcomes this objectionable characteristic by providing pressure gages of a type which can be mounted internally of the model thereby eliminating the long tubes of prior art devices and accordingly permitting instantaneous pressure measurements. This is accomplished, in one embodiment herein disclosed, by means of a cylindrical ring having diaphragms mounted on each end. Strain responsive means, specifically consisting of bonded wire strain gages of the spiral type are suitably secured to the inner and outer surfaces of each diaphragm. The ring is provided with a central aperture which is connected by means of a short tube with an aperture in the shell of the model to be tested. The strain gages are connected in a Wheatstone bridge provided with a suitable electrical source and recorder. The interior of the model is evacuated so that a known reference pressure is applied to the outer surfaces of the diaphragms. When the blow is begun, pressure variations are instantaneously transmitted to the inner surfaces of the diaphragms whereby the strain gages are distorted and a record of the pressure is obtained.

An object of this invention is to provide a means for instantaneously and accurately measuring the static and dynamic pressures on aerodynamic bodies in wind tunnels.

A further object of this invention is to provide a means for measuring the pressure developed at selected points on aerodynamic bodies and for immediately transforming such pressures into electrical signals.

Another object of this invention is the provision of a pressure measuring means in which strain gages are connected in such a manner as to provide for temperature compensation and to insure a high degree of accuracy.

Still another object of this invention is to provide a pressure gage embodying strain gages suitably secured to opposite sides of two diaphragms in which the inner surface is subjected to the test pressure and the outer surface to a reference pressure whereby small pressure variations may be accurately determined.

Other objects and many of the attendant advantages of this invention will be readily appreciated as the same becomes better understood by reference to the following detailed description when considered in connection with the accompanying drawings wherein.

Figure 1:
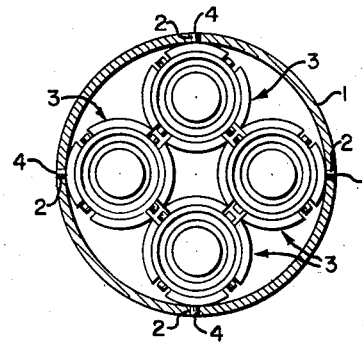
Fig. 1 is a cross sectional view of an aerodynamic model showing the relative positions of the pressure gages.

Referring now to the drawings wherein like numerals indicate like parts throughout the several views, there is shown in Fig. 1 in cross section a model 1 which is adapted to be disposed within a wind tunnel. It is desired to determine the static and dynamic pressures at a plurality of points on this model and for this purpose apertures 2 are provided. Pressure gages 3 have small short tubes 4 secured thereto which are fitted within apertures 2. It can be seen that by this construction the desired pressure is measured without employing long tubes which offer flow resistance and reduce the accuracy of the pressure measurement.

Figure 2:
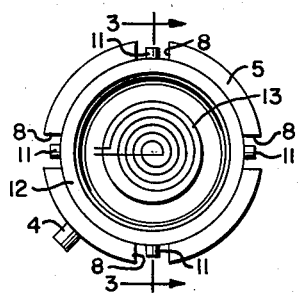
Fig. 2 is an elevational view of one form of a pressure gage.
Figure 4:
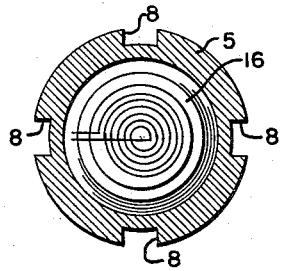
Fig. 4 is a sectional view along the line 4—4 of Fig. 3.
Figure 3:
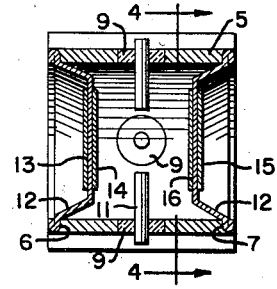
Fig. 3 is a sectional view along the line 3—3 of Fig. 2.
Figure 5:
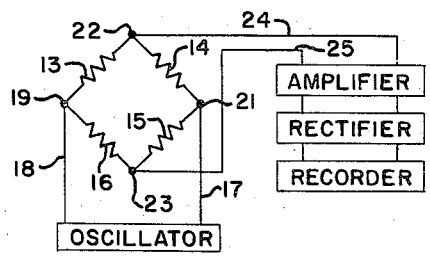
Fig. 5 is a view showing the manner of connecting the pressure indicator in an electrical bridge circuit.

One embodiment of the present invention is disclosed in Figs. 2 to 4 wherein there is shown a ring member 5 made of copper or other suitable material and which is provided with recessed portions 6 and 7. Ring member 5 is further provided with four circumferentially spaced grooves 8 and apertures through the ring member which are closed by means of glass seals 9 with Kovar conductor elements 11 extending therethrough. Each open end of the ring member is provided with a beryllium copper diaphragm 12 which is press fitted within recessed portions 6 and 7. Spiral strain gages 13 to 16 of a well known variety are secured in any suitable manner to both sides of diaphragms 12 as shown in Fig. 3. The internal strain gages 14 and 16 are connected to conductors 11 and the gages are connected externally in a bridge circuit in the manner clearly shown in Fig. 5. The oscillator output is transmitted through conductors 17 and 18 to points 19 and 21 of the bridge and the points 22 and 23 of the bridge are connected by conductors 24 and 25 to the amplifier.

It can be seen that, when the pressure gage is installed in the manner shown in Fig. 1 the diaphragms will respond to a pressure differential where the test pressure is applied through tube 4 on the inner surfaces of diaphragms 12 and a reference pressure acts against the outer surfaces of the diaphragms. This pressure is immediately transformed into an electrical signal by the strain gages and is recorded by any conventional means. It is apparent that resistance changes due to temperature variation are effectively cancelled by the arrangement of the strain gages in the bridge circuit.

Figure 6:
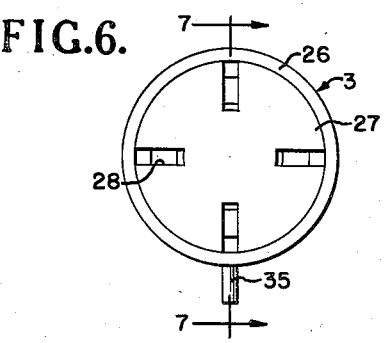
Fig. 6 is an elevational view of another form of the present invention.
Figure 7:
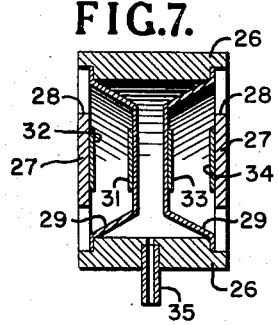
Fig. 7 is a sectional view along the line 7—7 of Fig. 6.

In Figs. 6 and 7 there is shown a modification of the presently disclosed pressure gage. In this embodiment a ring 26 similar to ring 5 is provided with metallic end plates in the form of discs 27 having cut-out portions 28. Diaphragms 29 are secured to ring 26 beneath discs 27 and strain gages 31 to 34 are suitably secured to the diaphragms and discs in the manner shown. The leads from the strain gages may be brought out through cut-out portions 28 thereby eliminating the necessity for the seals 9 and conductors 11 employed in the form shown in Figs. 2 and 3. With reference to the circuit diagram of Fig. 5 strain gages 31 to 34 are connected in the same manner as strain gages 13 to 16 respectively. Gages 32 and 34 provide for temperature compensation and are not responsive to pressure variations. In this embodiment the reference pressure is applied to the outer surfaces of the diaphragms through the cut-out portions 28 and the test pressure is admitted through tube 35.

It is apparent that there has been provided by the presently disclosed invention a means for accurately and instantaneously measuring the static and dynamic pressures on aerodynamic bodies. Various alterations in the structure are possible to adapt the pressure gage for measurements at points on the model where the use of the tube is not practical. For example, the volume within the ring member could be evacuated and sealed off to provide a fixed reference pressure and the test pressure applied to the outer surfaces of the diaphragms. Such a construction is particularly well adapted for pressure measurements at the base of a model where a large open area is presented.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A pressure gage comprising a hollow open-ended cylinder having an aperture in the sidewall thereof, a pair of diaphragms each having at least a portion thereof of planar contour, each of said diaphragms being frictionally secured within and sealing a respective open end of said cylinder to define an enclosed chamber therewithin for receiving an unknown pressure admitted therein through said aperture whereby said diaphragms are flexed an amount proportional to the unknown pressure, pressure-responsive strain gages carried by the outer planar surfaces of said diaphragms and variably responsive in a manner correspondingly representative of the flexures of said diaphragms, supporting means frictionally retained by said cylinder externally of said chamber and disposed as to be unaffected by the internal pressure conditions of said chamber, temperature compensating strain gages secured to said supporting means, and means including the first and second named strain gages in cooperative circuit relation for measuring the flexures of said diaphragms while simultaneously compensating for measurement errors due to temperature variations.

2. A pressure gage comprising a hollow open-ended cylinder having an aperture in the sidewall thereof, a pair of diaphragms each having a flat pressure-sensitive portion defined by interior and exterior planar faces on opposite sides of the diaphragm, each of said diaphragms being secured within and sealing a respective open end of the cylinder to define an enclosed chamber between adjacent interior faces of the diaphragms, said chamber forming a test volume to receive a fluid of unknown pressure through said aperture whereby the pressure exerted therefrom is uniformly distributed on said pressure-sensitive portions to cause flexures thereof proportional to the unknown pressure, pressure-responsive strain gages secured to the exterior faces of said pressure-sensitive portions and variably responsive in a manner correspondingly representative of the flexures of said portions, temperature compensating strain gages supported in juxtaposition to said pressure sensitive strain gages and disposed as to be unaffected by the pressure conditions of said chamber, and means including all of said strain gages in circuit relation for providing measurements of the diaphragm flexures independently of environmental temperature variations to which the pressure gage may be subjected.

3. A pressure gage comprising a hollow open-ended cylinder having an aperture in the sidewall thereof for permitting communication with the interior thereof, a pair of diaphragms each having a flat central pressure-sensitive portion and a peripheral non-pressure-sensitive portion so configured as to conformingly fit within the open ends of said cylinder, said flat central portion of each diaphragm being defined by parallel planar faces on opposite sides of the diaphragm, each of said diaphragms being disposed as to have its respective non-pressure-sensitive portion conformingly secured within and sealing a respective open end of the cylinder to define an enclosed chamber between adjacent planar faces of the diaphragms, said chamber forming a test volume to receive a fluid of unknown pressure through said aperture whereby the pressure exerted by said fluid on the diaphragms is uniformly distributed on said pressure-sensitive portions to cause flexures thereof proportional to the unknown pressure, pressure-responsive strain gages secured to the exterior planar faces of said pressure-sensitive portions and variably responsive in a manner correspondingly representative of the flexures of said sensitive portions, a pair of apertured disc-like members conformingly supported in the open ends of said cylinder in super juxtaposition to said diaphragms, temperature compensating strain gages secured to said members in spaced relation with the pressure-sensitive strain gages and disposed as to be unaffected by the pressure conditions of said chamber, and means including all of said strain gages in Wheatstone bridge connections for providing measurements of the diaphragm flexures independently of environmental temperature variations to which the pressure gage may be subjected.

4. A pressure gage comprising a hollow open-ended cylinder having an aperture in the sidewall thereof, a pair of diaphragms each having a flat central pressure-sensitive portion and a peripheral non-pressure-sensitive portion which is so configured as to conformingly fit within the open ends of said cylinder, said flat central portion of each diaphragm being defined by parallel planar faces on opposite sides of the diaphragm, each of said diaphragms being disposed as to have its respective non-pressure-sensitive portion conformingly secured within and sealing a respective open end of the cylinder to define an enclosed chamber between adjacent planar faces of the diaphragms, said chamber forming a test volume to receive a fluid of unknown pressure through said aperture whereby said pressure-sensitive portions are flexed an amount proportional to the unknown pressure, pressure-responsive strain gages secured to the exterior planar faces of said pressure-sensitive portions and variably responsive in a manner correspondingly representative of the flexures of said sensitive portions, a pair of apertured discs, said discs being secured respectively within the open ends of said cylinder in superjuxtaposition to said diaphragms but spaced from the flat central portions thereof, temperature compensating strain gages mounted on the inner surfaces of said discs and disposed relative to said diaphragms as to be unaffected by the flexures of the pressure-sensitive portions thereof, and means including all of said strain gages in Wheatstone bridge connection for providing measurements of the diaphragm flexures independently of environmental temperature variations to which the pressure gage may be subjected.

5. The pressure gage of claim 4, wherein each of said strain gages is spirally wound.

6. The pressure gage of claim 5, wherein each of said strain gages is of the electrical resistance type whereby the resistance variations of said pressure-sensitive strain gages due to flexures of the diaphragms causes an unbalance in potential across said Wheatstone bridge which is a measure of the unknown pressure, the resistance variations of said temperature compensating strain gages due to temperature variations acting to compensate for any measurement errors introduced in said Wheatstone bridge by the temperature variations.

7. In a pressure gage for measuring the unknown pressure of a fluid, a pressure sensitive measuring device comprising a pair of diaphragms each having a similarly configured pressure sensitive planar portion, a cylindrical housing having open ends into which said diaphragms are conformingly secured by frictional binding therewith to enclose a test volume within said housing between adjacent surfaces of said diaphragms, means including an orifice in the sidewall of said housing for providing communication with the interior thereof whereby a fluid may be supplied to said test volume to exert an unknown pressure on the planar portions of said diaphragms to cause movement thereof proportional to the unknown pressure, a first pair of spirally wound strain gages secured one on each outer face of the planer portions of said diaphragms whereby the resistance of said first pair of strain gages is varied an amount proportional to the movement of said planar portions, a pair of apertured disc-like flat members each conformingly secured by frictional binding within a respective open end of said cylinder and in superjuxtaposition to said diaphragms, said planar portions of the diaphragms being spaced from said flat members so as to be in non-abutting relationship with the interior surfaces of said flat members, a second pair of spirally wound strain gages secured one on each inner surface of said flat members whereby the resistance of said second pair of gages varies an amount proportional to temperature variations to which said measuring device may be subjected, said first and second pairs of strain gages being connected to form a Wheatstone bridge in which said first pair of strain gages form diagonally opposite legs of the bridge and said second pair of strain gages form the other diagonally opposite legs of the bridge, the resistance variations of said first pair of strain gages causing an unbalance of said bridge which is a measure of the unknown pressure, the resistance variations of said second pair of strain gages counteracting any bridge unbalance arising out of temperature variations, and means for measuring the unbalance of said bridge and indicating the value of said unknown pressure.

8. In the pressure gage of claim 7, an annular recess formed in each open end of said housing, each of said diaphragms being of similar frusto-conical configuration with a peripheral annular flat flange which is planarly displaced with respect to the planar portion of the diaphragm, said flanges being conformingly and frictionally retained within a respective one of said annular recesses to thereby rigidly secure said diaphragms within the open ends of said housing.

9. A pressure gage comprising, a hollow open-ended cylinder having an aperture in the sidewall thereof and an annular recess of predetermined circumference in each open end of said cylinder; a pair of similarly configured cup-shaped diaphragms; each of said diaphragms being defined by a planar circular base of resilient material and an annular member formed integral therewith, said annular member extending angularly from said base and progressively increasing in diameter to form at the end thereof remote from said base an annular lip having a circumference exceeding that of said circular base, a flat annular flange formed integral with said lip and extending outwardly therefrom in a plane parallel to the plane of said base to define a circular edge having a circumference substantially equal to said predetermined circumference; said diaphragms being disposed as to have their respective flanges conformingly and frictionally retained within a respective one of said annular recesses to thereby rigidly and sealingly secure said diaphragms within the open ends of said cylinder whereby an enclosed test volume is formed within said cylinder for receiving through said aperture a pressure producing fluid which exerts an unknown pressure on said resilient bases to thereby flex said bases an amount proportional to said unknown pressure, said diaphragms being so positioned that the bases thereof extend inwardly from their respective open ends and are in planes transverse to the longitudinal axis of said cylinder whereby each of said bases provides a planar face exposed to said test volume and an opposing planar face externally of said test volume; a first pair of spirally wound electrical resistance type strain gages secured one on each external face of said bases whereby the resistance of said first pair of strain gages is varied an amount proportional to the flexures of said bases; a pair of circular flat members having a circumference substantially equal to said predetermined circumference and quadrantally spaced cut-out portions extending therethrough, said circular flat members being positioned as to be conformingly and frictionally retained within a respective one of said annular recesses and in superjuxtaposition to said diaphragms, each of said circular flat members having a flat central interior surface disposed opposite the planar base of its respectively juxtaposed diaphragm and spaced therefrom; a second pair of spirally wound resistance type strain gages secured one on each central interior surface of said flat members whereby the resistance of said second pair of gages varies an amount proportional to temperature variations to which said pressure gage may be subjected; circuit means for connecting said first and second pairs of strain gages to form a Wheatstone bridge circuit in which the resistance variations of said first pair of strain gages causes a potential unbalance proportional to the unknown pressure and in which the resistance variations of said second pair of strain gages counteract any potential unbalance arising out of temperature variations; and means for measuring the potential unbalance of said bridge circuit and indicating the value of said unknown pressure.

References Cited in the file of this patent

UNITED STATES PATENTS

| Number | Name | Date |
|---|---|---|
| 2,420,148 | Ostergren | May 6, 1947 |
| 2,472,045 | Gibbons | May 31, 1949 |
| 2,488,347 | Thurston | Nov. 15, 1949 |
| 2,580,407 | Clark | Jan. 1, 1952 |
| 2,641,131 | Waugh | June 7, 1953 |

OTHER REFERENCES

"Mesures et Controle Industriel," vol. 14, No. 143, page 143, April 1949.